(12) United States Patent
Dutta et al.

(10) Patent No.: US 10,861,055 B1
(45) Date of Patent: Dec. 8, 2020

(54) METHOD AND SYSTEM FOR IDENTIFYING USERS ACROSS MOBILE AND DESKTOP DEVICES

(71) Applicant: Twitter, Inc., San Francisco, CA (US)

(72) Inventors: Chinmoy Dutta, Mountain View, CA (US); Santosh Kancha, Pleasanton, CA (US); Junjun Li, Redwood City, CA (US); Wanchen Lu, San Mateo, CA (US); Milind Mahajan, Seattle, WA (US); Sandeep Pandey, San Francisco, CA (US); Xiaochuan Qin, Issaquah, WA (US); Ameet Ranadive, San Francisco, CA (US); Vibhor Rastogi, San Francisco, CA (US); Shariq Rizvi, Mountain View, CA (US); Abhishek Shrivastava, Santa Clara, CA (US); Yimin Wu, Seattle, WA (US); Lei Zhang, Sammamish, WA (US); Ke Zhou, Walnut Creek, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/579,696

(22) Filed: Sep. 23, 2019

Related U.S. Application Data

(63) Continuation of application No. 15/019,959, filed on Feb. 9, 2016, now Pat. No. 10,423,985.

(60) Provisional application No. 62/113,876, filed on Feb. 9, 2015.

(51) Int. Cl.
*G06Q 30/02* (2012.01)
*G06Q 50/00* (2012.01)
*H04L 29/08* (2006.01)

(52) U.S. Cl.
CPC ..... *G06Q 30/0269* (2013.01); *G06Q 30/0201* (2013.01); *G06Q 30/0267* (2013.01); *G06Q 50/01* (2013.01); *H04L 67/02* (2013.01); *H04L 67/22* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 2,958,043 A | * | 10/1960 | Harding ............... G11B 20/16 327/336 |
| 10,055,754 B2 | | 8/2018 | Brown et al. |
| 10,204,239 B2 | | 2/2019 | Dabbiru et al. |

(Continued)

FOREIGN PATENT DOCUMENTS

WO  WO2010035949  4/2010

OTHER PUBLICATIONS

U.S. Appl. No. 14/796,609, filed Jul. 10, 2015, Winner.

(Continued)

*Primary Examiner* — Thomas L Mansfield
(74) *Attorney, Agent, or Firm* — Fish & Richardson P.C.

(57) ABSTRACT

A method for conversion attribution. The method includes obtaining a first identifier associated with a first device, obtaining a second identifier associated with a second device, bridging the first identifier and the second identifier based on a determination, made by a probabilistic classifier, that the first identifier and the second identifier are associated with a common user, and attributing, using the bridge, a conversion on a website accessed using the second device.

18 Claims, 9 Drawing Sheets

(56) References Cited

U.S. PATENT DOCUMENTS

| | | | |
|---|---|---|---|
| 10,423,985 | B1 | 9/2019 | Dutta et al. |
| 2006/0004892 | A1 | 1/2006 | Lunt et al. |
| 2007/0128899 | A1* | 6/2007 | Mayer .................. G06F 9/4406 439/152 |
| 2009/0077645 | A1 | 3/2009 | Kottahachchi |
| 2011/0239284 | A1* | 9/2011 | Kaji ..................... G06F 21/305 726/6 |
| 2012/0303425 | A1 | 11/2012 | Katzin et al. |
| 2013/0124309 | A1* | 5/2013 | Traasdahl .......... G06Q 30/0241 705/14.49 |
| 2014/0095297 | A1* | 4/2014 | O'Reilly ............ G06Q 30/0267 705/14.45 |
| 2014/0244351 | A1 | 8/2014 | Symons |
| 2014/0279837 | A1* | 9/2014 | Guo ..................... G06F 16/282 707/603 |
| 2014/0365296 | A1* | 12/2014 | McDonnell ........ G06Q 30/0242 705/14.45 |
| 2015/0134459 | A1* | 5/2015 | Dipaola ............. G06Q 30/0261 705/14.64 |
| 2015/0242885 | A1* | 8/2015 | Alsina ................ G06Q 30/0246 705/14.43 |
| 2016/0048869 | A1* | 2/2016 | Shim .................. G06Q 30/0246 705/14.45 |
| 2016/0203338 | A1 | 7/2016 | Dabbiru et al. |

OTHER PUBLICATIONS

Final Office Action in U.S. Appl. No. 14/796,609 dated Oct. 3, 2018, 40 pages.

Hash function. Wikipedia 2008. Accessed at https://en.wikipedia.org/wiki/Hash_function on Sep. 28, 2018, 12 pages.

Non-Final Office Action in U.S. Appl. No. 14/796,609 dated Mar. 9, 2018, 27 pages.

* cited by examiner

METHOD AND SYSTEM FOR IDENTIFYING USERS ACROSS MOBILE AND DESKTOP DEVICES

CROSS-REFERENCE TO RELATED APPLICATIONS

This application is a continuation application of, and claims priority to, U.S. patent application Ser. No. 15/019,959, filed on Feb. 9, 2016, and now U.S. Pat. No. 10,423,985, which claims the benefit of the filing date of U.S. Provisional Patent Application No. 62/113,876 filed Feb. 9, 2015. The disclosure of the foregoing applications are incorporated here by reference.

BACKGROUND

In order to determine the effectiveness of online advertising campaigns, companies have traditionally relied on tracking logged-in users across one or more devices. In particular, user activity may be tracked, for example, in cases in which a user is logged into a service, e.g., a social media service or an email service, where a unique user ID is used by the service to identify the user, regardless of the device being used. While the aforementioned mechanism may be useful in tracking logged-in users, the above mechanism is unable to track activities of users that are not logged-in to a service.

SUMMARY

Embodiments of the technology enable the identification of users across multiple devices including mobile and desktop devices. More specifically, embodiments of the invention enable analysis of different identifiers in order to ascertain that distinct identifiers are associated with the same user. The aforementioned process may be referred to as ID bridging (i.e., determining that two identifiers are associated with the same user). Embodiments of the invention use the results of deterministic ID bridging in order to train a classifier which is subsequently used to perform probabilistic ID bridging. Deterministic bridging may be used whenever dispositive proof exists that two particular identifiers are associated with the same user. Probabilistic ID bridging may be used whenever there is a reasonable probability that two particular identifiers are associated, but for which no dispositive proof has been obtained. Probabilistic bridging can be implemented programmatically by machine learning systems that apply heuristics over vast data on various digital foot prints that may be linked to a particular user. This two-phase approach to ID bridging enables additional bridges to be created, where such bridges could not be created using only deterministic ID bridging. For example, in certain implementations of the invention the use of the combination of deterministic ID bridging and probabilistic ID bridging may result in a 2.5 times increase in the number of bridges that may be created as compared with only using deterministic ID bridging. In certain embodiments the probabilistic ID bridging may rely on certain features such as IP addresses, time windows, weights, and/or probabilities.

The results of the ID bridging, in accordance with an embodiment of the invention, may facilitate attribution of, for example, a purchase to an ad viewed elsewhere by the same user.

In various embodiments of the invention, ID bridging may further be performed to obtain additional knowledge about the identity of a user. For example, if one identifier includes the social media ID of the user, and another identifier includes a location, contact information, or other user, it may be beneficial to join these elements to obtain a more comprehensive user profile. Any type of information associated with any identifier may be included in the common profile.

Knowledge about a user's identity, her location, interests and/or behaviors, obtained by combining information about the user associated with various identifiers, may be used for targeting the user with custom advertisements.

In general, in one aspect, the invention relates to a method for conversion attribution, including obtaining a first identifier associated with a first device, obtaining a second identifier associated with a second device, bridging the first identifier and the second identifier based on a determination, made by a probabilistic classifier, that the first identifier and the second identifier are associated with a common user, and attributing, using the bridge, a conversion on a website accessed using the second device.

In general, in one aspect, the invention relates to a non-transitory computer readable medium including instructions for performing a method, the method comprising performing deterministic ID bridging to obtain a set of deterministic ID bridges, training a probabilistic classifier using the set of deterministic ID bridges, obtaining a first identifier associated with a first device and a second identifier associated with a second device. The method further comprises, after the training: bridging the first identifier and the second identifier based on a determination, made by the probabilistic classifier, that the first identifier and the second identifier are associated with a common user, and attributing, using the bridge, a conversion on a website accessed using the second device, wherein the conversion is attributed when the user accesses the webpage within a predetermined period of time after viewing an advertisement on the first device.

DETAILED DESCRIPTION

Figure 1A:
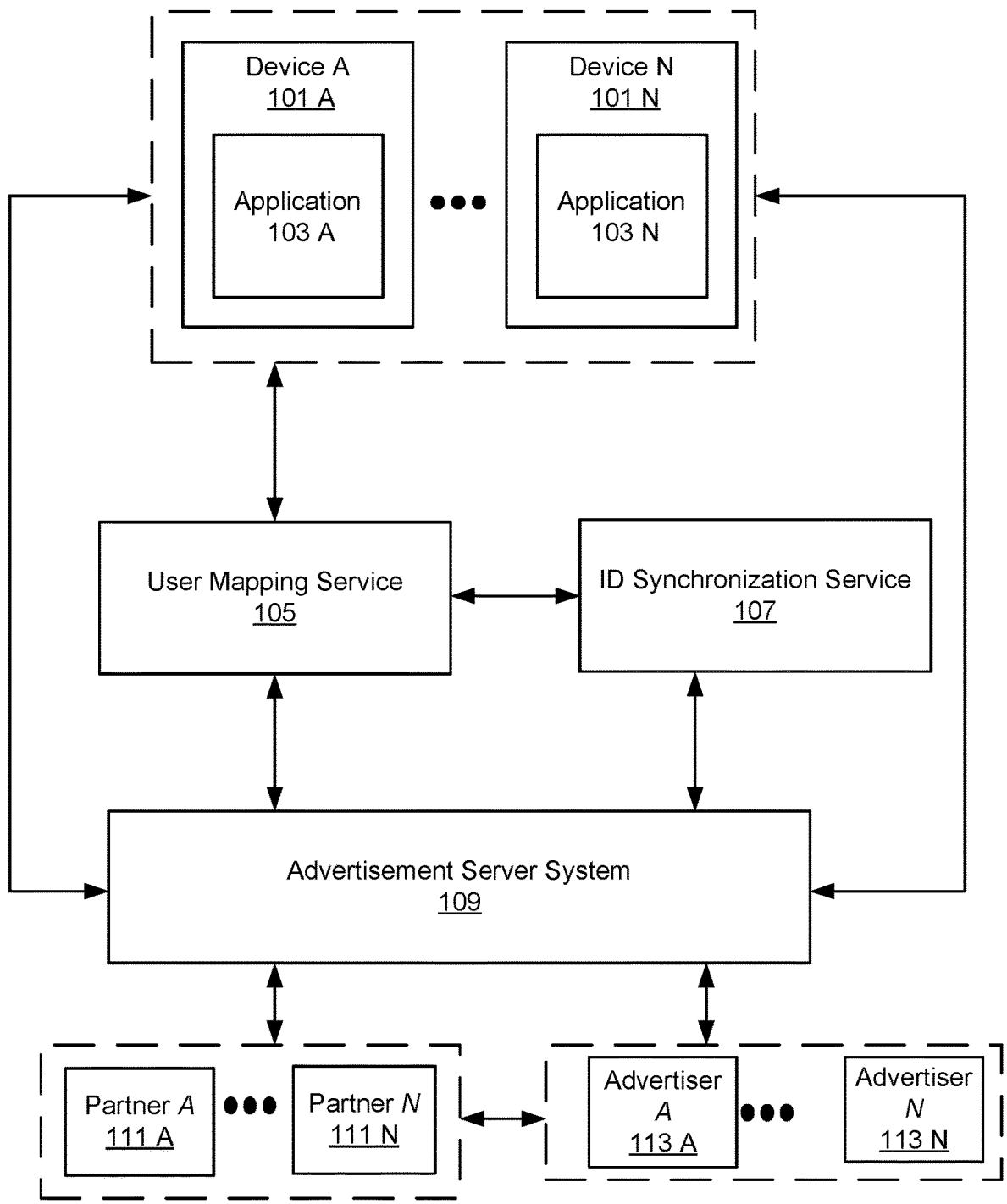
FIG. 1A shows a system in accordance with one or more embodiments of the invention.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for determining the relationships between various identifiers used in computing systems and then using these determined relationships to understand how users are interacting with various content (including advertisements) within websites and mobile applications. The aforementioned relationships may be established using both deterministic and/or probabilistic approaches. Further, the results of the deterministic ID bridging may be used to train a classifier that is subsequently used for probabilistic ID bridging. Each of these approaches is discussed below.

One or more embodiments of the invention may be used to determine relationships between one or more of the following types of identifiers: device IDs, social media IDs, partner user IDs, and guest IDs. Each of the identifier types is discussed below. Those skilled in the art will appreciate that the invention is not limited to the aforementioned types of identifiers.

A device ID, in accordance with an embodiment of the invention, is a distinctive identifier associated with a device, including but not limited to, cellular phone, desktop computer, etc., used by a user. The device ID may be logged by various logging services whenever the device sends a request, accompanied by the device ID.

A partner user ID, in accordance with an embodiment of the invention, is a distinctive identifier, associated with a user, assigned by a partner and/or an advertising platform, e.g. a demand-side platform (DSP). A partner user ID may be assigned to a user when they navigate to particular a webpage or when they are provided with an advertisement from a particular partner. For example, a DSP may have a tracking pixel placed on a webpage, e.g. the webpage of a vendor that cooperates with the DSP, and a visit to the vendor webpage by the user may result in the automatic generation of a partner user ID and the dropping of a cookie with the partner user ID on the user's device. The partner user ID may be logged by various logging services whenever, as a result of the tracking pixel firing, the partner user ID is sent by the device.

A social media ID, in accordance with an embodiment of the invention, is a distinctive identifier associated with a user, assigned by a social media network, e.g., the login name of the social media account. The social media ID may be logged by various logging services whenever the device transmits the social media ID. In one embodiment of the invention, a social media network may be, for example a combination of software and/or hardware that enables or facilitates the social interaction among people by supporting the creation, sharing and/or exchanging of information, ideas, pictures and/or videos in virtual communities and networks.

A guest ID, in accordance with an embodiment of the invention, is a distinctive identifier associated with a user, assigned by a service such as a social media network. Unlike the social media ID which may only be assigned to users that are members of the social media network, a guest ID may be assigned to any user, even to users that are not members of the social media network, when the user is visiting a website associated with social media network. The guest ID may be logged by various logging services whenever the device transmits the guest ID. In one embodiment of the invention, the guest ID may be assigned to any user that, for example, navigates to a website of a social media network when the user is not logged into the social media network.

FIG. 1A shows a system in accordance with one or more embodiments of the invention. As shown in FIG. 1A, the system has multiple components including one or more devices (101A-101N), each executing an application (103A-103N), a user mapping service (105), an ID synchronization service (107), an advertisement server system (109), one or more partners (111A-111N), and one or more advertisers (113 A). Each of these components is described below.

In one or more embodiments of the invention, each device (101A-101N) may be a desktop personal computer (PC), a laptop, a tablet computer, an electronic reader (e-reader), a cable box, a kiosk, a smart phone, a server, a mainframe, a personal digital assistant (PDA), or any other type of hardware device. Each device may be a computing device similar to the computing system shown in FIG. 7 that may include a processor that executes the one or more applications (103A-103N). The device may communicate (directly or indirectly) with the user mapping service (105) and/or the advertisement server system (107) using any wired and/or wireless (e.g., Wi-Fi, cellular, etc.) connections.

In one or more embodiments of the invention, the application (103A-103N) may be a software application of any type (e.g., operating system, messaging application, social media application, game, word processing application, web browser, etc.). The application may be implemented to include one or more advertisement placements. An advertisement placement is a predefined space in an application used to display one or more native or non-native online advertisements. For example, the advertisement placement may be a specific location within the user interface of an application. In another example, the advertisement placement may be associated with a feature in the application, e.g., in a news feed, a message feed, or stream. In one embodiment of the invention, the stream is a presentation of, list of, or other organization of content within application (103A-103N). The stream may include both content and ads (which may include native ads).

In one or more embodiments of the invention, the application may be deployed along with a software development kit (SDK). During the execution of the application, the SDK may issue a fill request to the advertisement server system (109). The fill request may be a request for advertisement content from the advertisement server system (109). In order to generate an advertisement and populate the advertisement placement. The fill request may take the form of a uniform resource locator (URL). Moreover, the fill request may include one or more parameters including an advertisement placement ID, a device ID, the version of the SDK, one or more keywords, a type of content (e.g., sports, cars, pets, vacations, clothes, etc.) displayed around the advertisement placement, a type of connection (e.g., Wi-Fi, cellular, etc.) between the device (101) and the advertisement server system (109), etc.

In one or more embodiments of the invention, the one or more partners (111A-111N) and/or the one or more advertisers (113A-113N) provide the advertisement content to the advertisement server system (109). Different partners and advertisers may provide advertisement content in different formats. Further, the advertisement content provided by the one or more partners and the one or more advertisers may be in a format that is different from the format of the advertisement content required/requested to generate and populate the advertisement placement.

In one or more embodiments of the invention, the ID synchronization service (107) includes functionality to receive, store, and deliver information to the user mapping service (105). The ID synchronization service (107) may be capable of receiving and storing information from the one or more advertisers, either directly or indirectly via the one or more partners and/or the advertisement server system (109). The aforementioned information may include an IP address used to access an advertiser's webpage, a timestamp associated with the access, a social media ID associated with the access, a partner user ID associated with the access, personal information (e.g., phone number, electronic mail address, facsimile number, physical mailing address, etc.) associated with the partner user ID, etc. The ID synchronization service (107) may be implemented on a computing device similar to the computing system shown in FIG. 7 and may be configured to communicate with the user mapping service (105). Additional details about the ID synchronization service are provided below.

In one or more embodiments of the invention, the user mapping service (105) includes functionality to receive, store, and deliver information to the applications, the ID synchronization service (107), and/or the advertisement server system (109). The user mapping system (105) may be configured to receive and store information associated with an access of the application by the device. Information may include an IP address used to access the application, a timestamp associated with the access, the social media ID associated with the access, the device ID associated with the device accessing the application, etc. The user mapping service (105) may be implemented on a computing device similar to the computing system shown in FIG. 7 and may be configured to communicate with the devices (101A-101N) and the ID synchronization service (107).

The user mapping service (105), in accordance with an embodiment of the invention, is further configured to retrieve information including the IP address used to access the advertiser webpage, the timestamp associated with the access, the social media ID associated with the access, the partner user ID associated with the access and/or personal information (e.g., phone number, electronic mail address, facsimile number, physical mailing address, etc.) associated with the partner user ID, etc.), directly from the one or more advertisers or indirectly from the ID synchronization service (107). In one or more embodiments of the invention, the aforementioned information, obtained by the user mapping service, may be obtained and stored in accordance with current privacy and/or data protection requirements.

Upon communicating with both the device (e.g., 101A, 101N) and the ID synchronization service (107), the user mapping service (105) may possess two sets of information and may create mappings that, on the basis of a comparison between the social media ID associated with application and the social media ID associated with the visit to the advertiser website (the visit to the advertiser website may or may not have been made on the same device that is executing the application), maps, for example, the device ID to the partner user ID. Accordingly, as the user visits multiple advertiser websites (where the user may or may not possess a different partner user ID corresponding to each advertiser website), it may be possible to create a mapping that maps multiple partner user IDs to the device ID(s). In one embodiment of the invention, the partner user ID corresponds to an ID associated with the user when the user accesses an advertiser's website, e.g., via a web browser. In some embodiments of the invention, the partner user ID corresponds to an ID that is associated with the advertiser website. The user mapping server may also generate mappings between other identifiers, without departing from the invention.

The mappings may help quantify the effectiveness of an online advertisement. Details of using the mappings to attribute conversions to online advertisements, in accordance with one or more embodiments of the invention, are described in FIGS. 2-4.

In one or more embodiments of the invention, the advertisement server system (109) is configured to communicate with the application (103A-103N), the user mapping service (105), the one or more partners, the one or more advertisers (113A-113N), and/or other entities required to facilitate the fulfillment of native or non-native advertisements in the application (103A-103N). The advertisement server system (109) includes functionality to interface with partners (111A-111N), advertisers (113A-113N). As described above, in one embodiment of the invention, the advertisement server system solicits the aforementioned entities to provide an ad and then may ultimately select an ad from the set of ads that are provided. The selection of the particular ad may depend on several factors. Some of these factors may be related to the identity of the user.

In response to having received a fill request from an application (103A-103N), the advertisement server system (109) may forward the request, including information about mappings, obtained from the user mapping service (105), to the one or more partners, one or more ad exchanges (not shown) and/or the one or more advertisers (113A-113N). In one or more embodiments of the invention, the mapping information enables partners (111A-111N) and/or advertisers (113A-113N) to obtain and understand the purchasing behavior of a user associated with a particular partner user ID. A partner(s), and/or advertiser(s) may thus make a decision about whether to bid for placing an ad in the advertisement placement in the application (103A-103N) that the user is accessing.

In one or more embodiments of the invention, the partner aggregates ads (directly or indirectly) from a variety of different advertisers and then provides these ads to the advertisement server system (109).

In one embodiment of the invention, an advertisement exchange is a platform that allows real-time bidding (RTB) on advertisement placements by the one or more partners (111A-111N) and/or the one or more advertisers (113A-113N). Using an advertisement exchange, publishers may auction the advertisement placement to the highest bidder through a single interface.

In one embodiment of the invention, the one or more advertisers (113A-113N) include their own ad content and provide this ad content directly to the advertisement server system.

While FIG. 1A shows a system in accordance with one or more embodiments of the invention, the architecture of the system is not limited to the components shown in FIG. 1A. Those skilled in the art will recognize that the system may, for example, include additional servers. For example, there may not be a single advertisement server system. Instead, multiple servers may be necessary to support a large user base. Further, various functionalities that are separately described may be combined on a single server. For example, the ID synchronization service and the user mapping service may execute on the same server. Also, the components of the system, including the portable device (101A-1-101N), the ID synchronization service (107), the user mapping service (105), the advertisement server system (109), the partner servers (111A-111N) and the advertiser servers (113A-113N) may communicate using any combination of wired and/or wireless communication protocols. The network used to connect the above components may include wide area network segments (e.g., the Internet), and/or a local area network segments (e.g. enterprise or home networks). The communication between the components may include any combination of secured (e.g., encrypted) and non-secured (e.g., un-encrypted) communication. The manner in which the components communicate may vary based on the implementation of the invention.

Figure 1B:
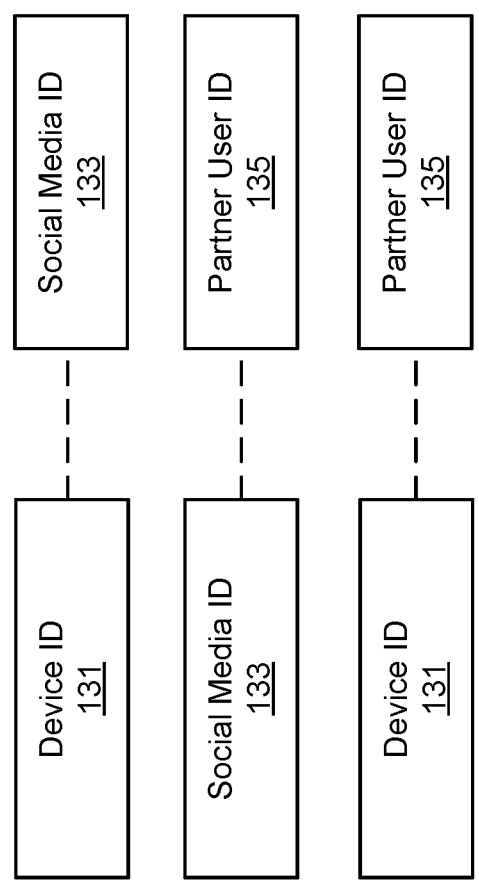
FIG. 1B shows mappings between various identifiers in accordance with one or more embodiments of the invention.

FIG. 1B shows mappings between various IDs in accordance with one or more embodiments of the invention. These mappings may be stored and updated by the user mapping service (105). The information described below may be stored in one or more data structures. Any type of data structure (e.g., arrays, linked lists, hash tables, etc.) may be used.

The user mapping service (105), in accordance with one or more embodiments of the invention, stores a mapping of the device ID (131) and the social media ID (133). The device ID (131) is a distinctive identifier (typically comprising numbers and letters) associated with a device, including but not limited to, a cellular phone, a desktop computer, etc. The social media ID (133) may be a username associated with a social media network, including but not limited to, Twitter. The user mapping service (105) may store many mappings between many device IDs and many social media IDs. For example, a social media network may have millions of users, with each user having a social media ID. Many of these users may further use multiple devices to access the social media network.

The mapping between the device ID (131) and the social media ID (133) may be created when a user of the device inputs his or her social media ID (133) when accessing an application (e.g., 103A). The mapping between the social media ID (133) and the partner user ID (135) may be created, for example, in accordance with the scenario shown in FIG. 6. Finally, the mapping between the device ID (131) and partner user ID (135) may be determined using the two aforementioned mappings. An example of how the aforementioned mappings may be created is shown in FIG. 6.

Figure 2:
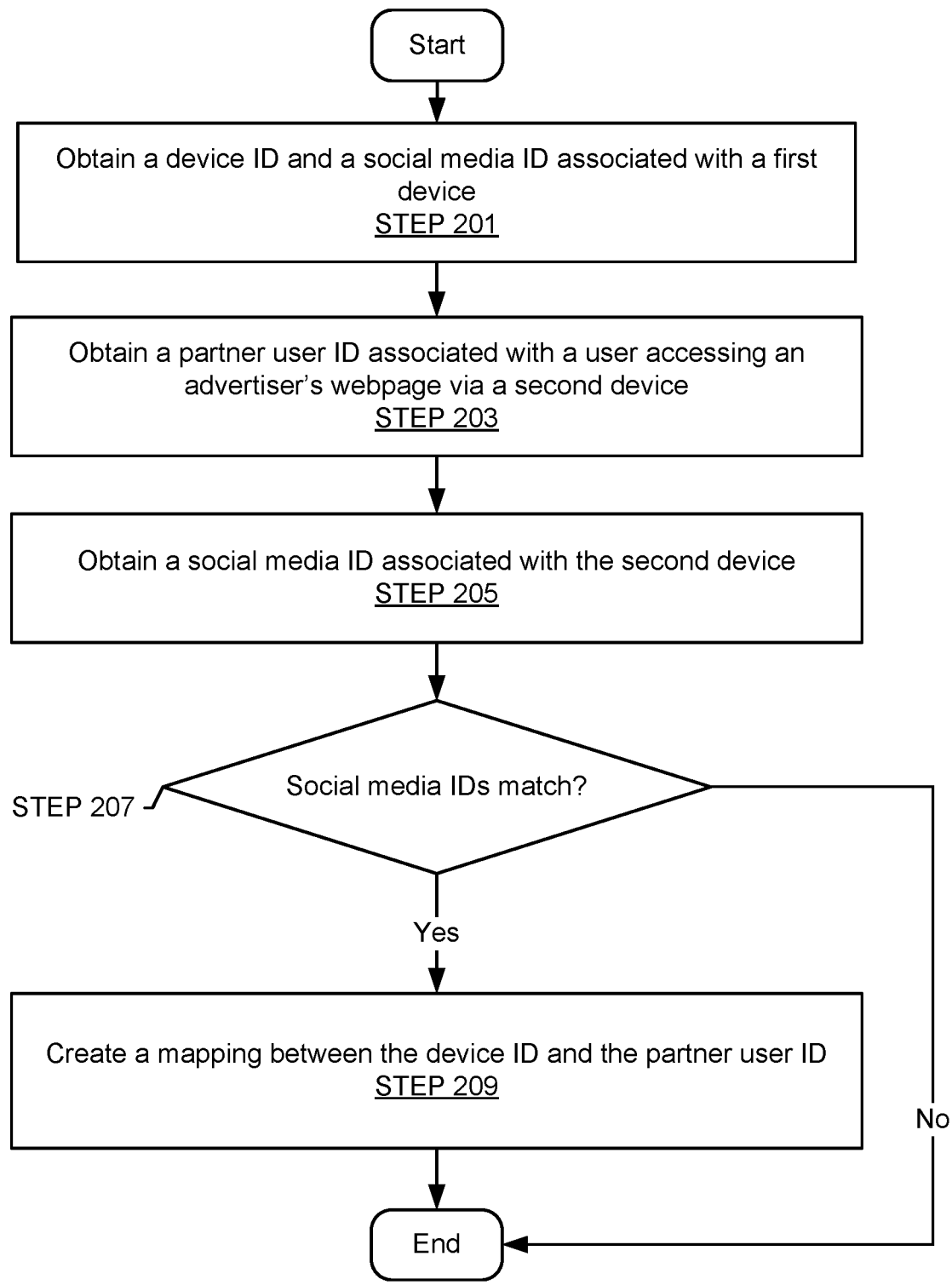
FIG. 2 shows a method for bridging identifiers using a deterministic method in accordance with one or more embodiments of the invention.
Figure 3A:
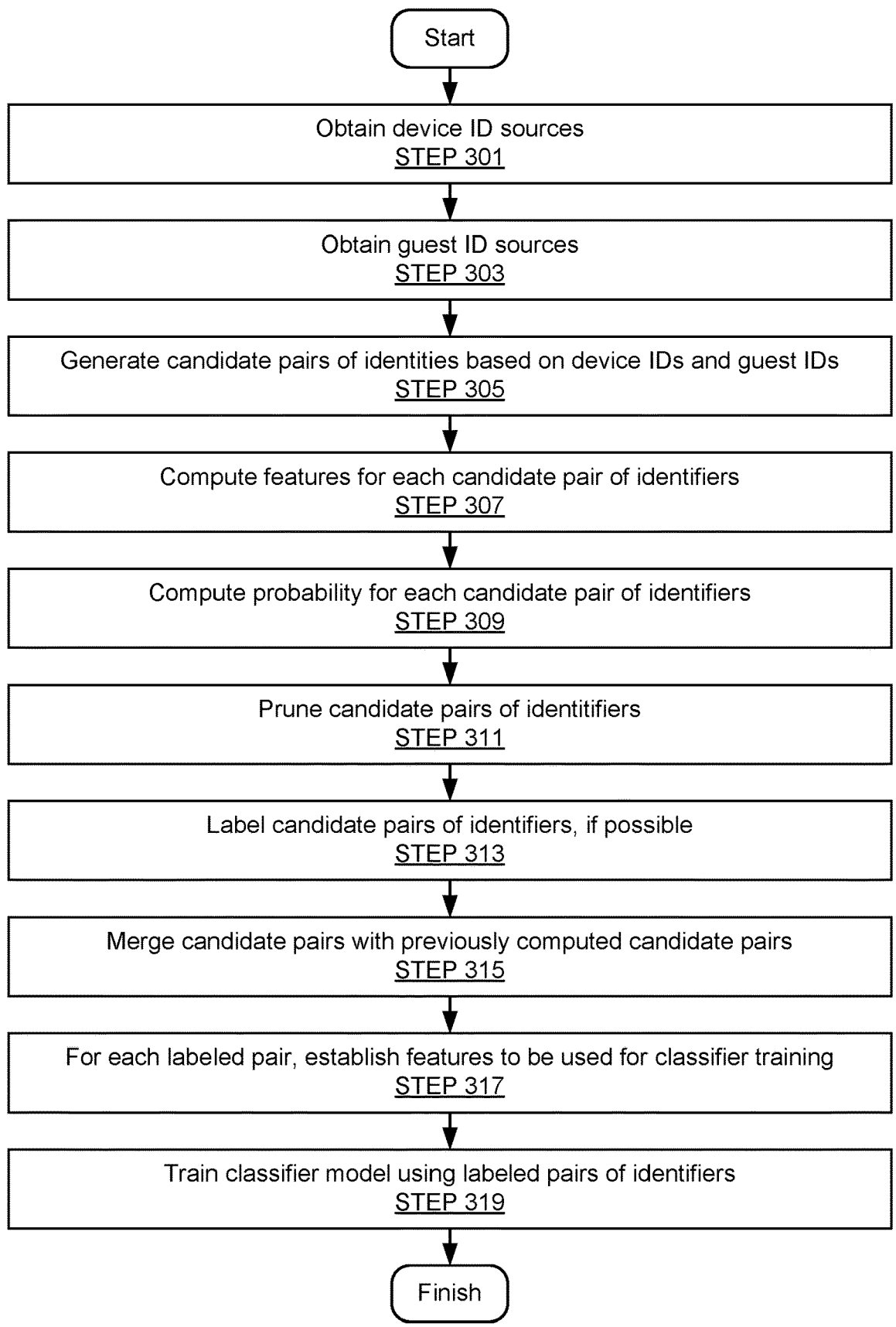
FIGS. 3A and 3B show methods for bridging identifiers using a probabilistic method in accordance with one or more embodiments of the invention.
Figure 6:
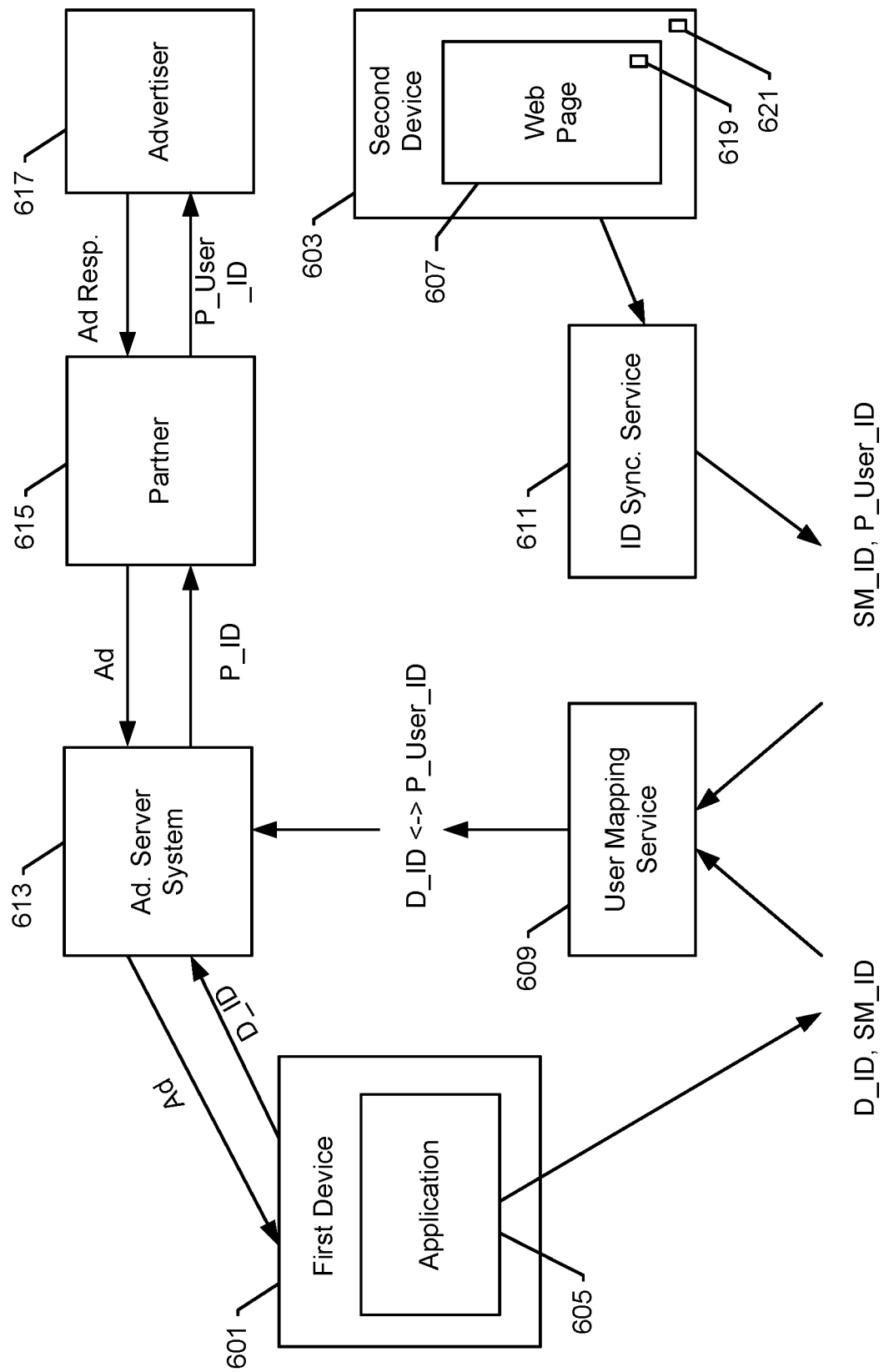
FIG. 6 shows an example in accordance with one or more embodiments of the invention.

The mappings shown in FIG. 1B may be established using deterministic bridging, for example, as described in FIG. 2 and in FIG. 6. In such cases, a common ID (e.g., a device ID, a social media ID, and/or a Partner User ID) may be used to establish the deterministic ID bridging. In scenarios in which there is no common ID, the mappings shown in FIG. 1B may be establishing using probabilistic bridging as shown in FIGS. 3A and 3B.

Figure 3B:
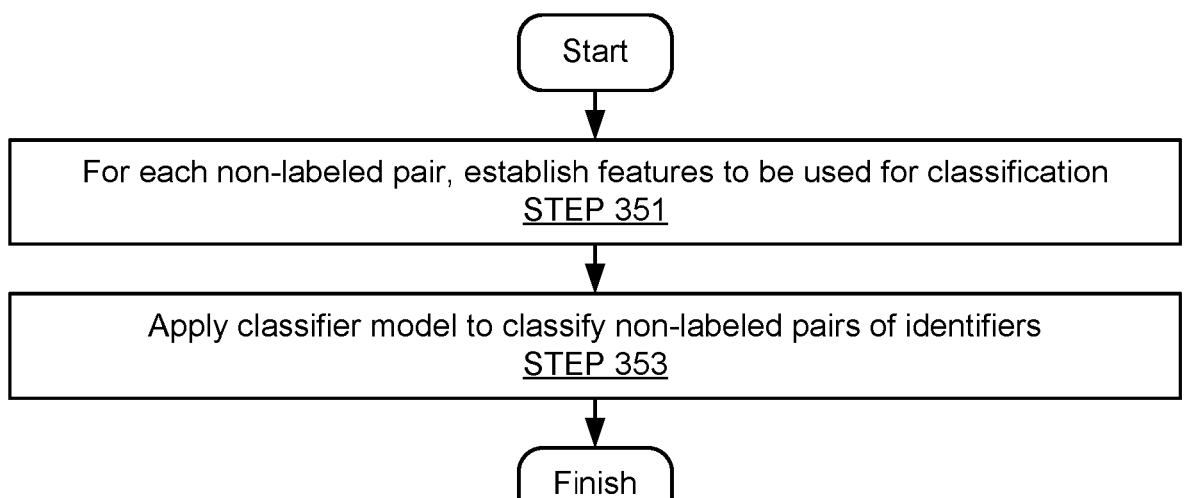

FIGS. 2-3B show methods for identifying users across mobile and desktop devices, in accordance with one or more embodiments of the invention. The execution of the method described in FIGS. 2-3B may be triggered by a user selecting an advertisement (or other external content) in an application, e.g. in a social media application. Alternatively or additionally steps of FIGS. 2-3B may be executed periodically, for example, in order to process identifiers in batches.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 2-3B may be performed in parallel with any other steps shown in FIGS. 2-3B without departing from the invention.

FIG. 2 shows a method for bridging identifiers, i.e. for identifying identifiers of different types that are affiliated with the same user, using a deterministic method in accordance with one or more embodiment of the invention. The method shown in FIG. 2 may be executed by the user mapping service. The method shown in FIG. 2 may be referred to as deterministic ID bridging.

In Step 201, a device ID and a social media ID, associated with a first device, are obtained. The social media ID may be obtained by the user mapping service, for example, when a user inputs his or her social media ID to gain access to a social media platform. A cookie that includes the social media ID may be provided to the device for retrieval at a later time. Consider, for example, a scenario in which a user installs a social media application (e.g., the Twitter application for an iPhone®) on her mobile device. In this scenario, when the user launches the social media application and logs in to the social media application on the mobile device, the device ID (i.e., the unique ID of the mobile device) and the corresponding social media ID (i.e., the social media ID that the user used to login into the social media application) may be provided to the user mapping service.

In Step 203, a partner user ID associated with a user accessing an advertiser webpage using a second device is obtained. In one embodiment of the invention when a user accesses an advertiser webpage, a partner pixel on the webpage may make a call to a server operated by a partner (i.e., the entity that embedded the partner pixel on the advertiser webpage). The partner pixel may be, for example, a segment of HTML, JavaScript or any other type of browser-executable code, etc. that executes once partner pixel fires, e.g., when the user accesses the advertiser webpage. In one embodiment of the invention, the partner pixel includes code that, when the tracking pixel fires, retrieves the partner user ID from the device used for accessing the advertiser webpage, where it may be stored, for example, in a cookie. Next, the tracking pixel may transmit the retrieved partner user ID, e.g., to the server operated by the partner. The server may archive the partner user ID and/or may forward the partner user ID to the user mapping service.

In Step 205, a social media ID associated with the second device is obtained from a cookie installed on the second device. The cookie may be a cookie analogous to the cookie discussed in Step 201, i.e., a cookie that was generated when the user accessed the social media platform using the second device, or it may be a different mechanism for storing the social media ID.

In Step 207, the social media ID obtained in Step 201 and the social media ID obtained in Step 205 are compared. If the social media IDs match, the method may proceed to Step 209. A match may indicate that the same user may be using the first and the second device. If the social media IDs do not match, the execution of the method may terminate without the generation of a mapping. In this case, the method may be re-executed for a different combination of previously obtained social media IDs. The method may be re-executed until a pair of matching social media IDs is detected.

In Step 209, a mapping between the device ID and the partner user ID is created based on the matching social media IDs. The mapping, by the user mapping service may thus enable the identification of a user across multiple devices, and/or may enable the identification of multiple partner user IDs that are affiliated with a particular user. The mappings generated in step 209 may be referred to as deterministic ID bridges.

In scenarios in which the user executes the application and causes the firing of the pixel on the first device rather than on a second device, Step 207 may be omitted. In this case, the device ID may be used to map the social media ID to the partner user ID. Both the action taken in the application and the access of an advertiser website may be attributed to the device ID of the first device. Accordingly, in this embodiment, as long as the user who accesses the application and the user who visits the advertiser webpage share the same device ID, the user may be considered the same person.

FIGS. 3A and 3B show probabilistic methods for bridging identifiers, i.e., for identifying identifiers of different types that are affiliated with the same user, in accordance with one or more embodiments of the invention. The bridging described in FIGS. 3A and 3B may be used, for example, when there is no direct link between a first ID and a second ID. Consider the bridging performed between a device ID and a partner user ID, described above with reference to FIG. 2. The bridging may be performed based on a common ID such as the social media ID. However, such a common ID may not always be available. In this case, the methods described in FIGS. 3A and 3B may nevertheless enable successful bridging between the two identifiers. In one embodiment of the invention, the bridging is performed using a classifier (also referred to as a probabilistic classifier). The classifier, in accordance with an embodiment of the invention, is programmed to determine whether two identifiers correspond to the same user. The classifier may be configured based on pairs of identifiers where a correspondence is known. These pairs of identifiers may be used as training data for the classifier. FIG. 3A describes the training of the classifier. FIG. 3B describes the application of the classifier on newly obtained identifiers, i.e. on identifiers where corresponding identifiers are unknown, in order to determine whether bridging can be performed for those identifiers. Although the subsequently described bridging refers to device IDs and guest IDs, those skilled in the art will appreciate that bridging may also be performed between other types of identifiers, without departing from the invention. For example, bridging may be performed between guest IDs and social media IDs, between guest IDs and partner user IDs, etc. The methods described in FIGS. 3A-3B may be referred to as probabilistic ID bridging.

FIG. 3A shows a method for training a classifier to be used for bridging of identifiers, in accordance with an embodiment of the invention. The method may be executed periodically, e.g., daily, to update or re-compute the classifier to be used for bridging identifiers, to reflect newly obtained identifiers. The method may be executed by the user mapping service.

Turning to FIG. 3A, in Step 301, device IDs are obtained. Device IDs may be transmitted by devices that are operated by users to access social networks, advertisements, and/or other content. These device IDs may be stored in, for example, ad exchange logs and/or client event logs, e.g., of a social media network. A device ID stored in a log may be accompanied by a timestamp for when the device ID was received by the log, an Internet Protocol (IP) address from where the device ID was received, and other information such as an operating system and/or a browser used on the device, etc. These device IDs, logged in ad exchange logs and/or in client event logs over time, may be retrieved by the user mapping service, in Step 301.

In Step 303, guest IDs are obtained. Guest IDs may be transmitted by devices that are operated by users to access web content. A guest ID, as previously described, may be an identifier relied upon by the social media network to identify a user that is not a member of the social network, but that may have visited the social network prior to visiting a web page that triggers the sending of the guest ID. The visited web page may have code embedded which, upon the user's visit, triggers the identification of the user via the guest ID, and transmits the guest ID to a logging service, e.g., to a social media button log (such as, in case of the Twitter network, a log may be maintained for logging user identity data returned from web pages that have the "Tweet" button embedded). Further, other logs that receive user identity data from other user tracking mechanisms such as tracking pixels, web beacons, JavaScript tags, etc. may also be used for logging. Information accompanying a logged guest ID may include, for example, a timestamp for when the guest ID was received by the log, an IP address from where the guest ID was received, and other information such as an operating system and/or a browser used on the device, etc. The guest IDs, logged over time, in Step 303 may be retrieved by the user mapping service.

In Step 305, candidate pairs of identifiers are generated from the device IDs and the guest IDs collected in Steps 301 and 303. A pair, in accordance with an embodiment of the invention, is a combination of a device ID and a guest ID, where both the device ID and the guest ID are affiliated with the same IP address. The device ID and the guest ID may need to be logged within a certain time interval, for example, no further than 24 hours apart, in order to qualify for being considered a candidate pair. The time interval to be considered may be configurable.

Consider, for example, a scenario in which a user has a home network. The home network has an IP address "123.123.123.123", assigned by the user's internet service provider. A smailphone and a desktop PC are connected to the home network. Both devices thus operate using the "123.123.123.123" IP address. At 11 PM, the user accesses the Twitter social media network using his smailphone application. The smailphone device ID is logged, along with the IP address (123.123.123.123) and a timestamp (11 PM). In addition, other information may be logged. For example, the user's social media ID may be logged. The next morning at 7 AM, the user accesses an airline's webpage from his desktop PC to complete the check-in for an upcoming flight. The airline webpage has a Twitter "Tweet" button embedded in the webpage and reports a user's guest ID to a logging service, which archives the guest ID along with the IP address (123.123.123.123) and a timestamp (7 AM, next day). No social media ID is logged because the user is not logged on to a Twitter account on his desktop PC. The user mapping service generates a candidate pair from the two entries because both entries originated from the same IP address and occurred within a 24 hour time window.

Many other candidate pairs may be generated. For example, the user's daughter may interact with various social media networks and may access web content. Some or all of her actions may generate entries that, because they also originated from the same IP address and because they also occurred within the 24 hour time window, may be considered for forming candidate pairs. Thus, candidate pairs of logged device IDs and guest IDs may be formed, regardless of the user that has caused the log entry. The steps below attempt to identify the candidate pairs where device IDs and guest IDs belong to the same user.

In one embodiment of the invention, multiple social media IDs may exist for the same device ID, for example, when multiple users rely on the same device to access their social media account. In this case, separate candidate pairs of identities may be used, even if the device ID and the guest ID are the same, in order to disambiguate between the users.

Continuing with the discussion of FIG. 3, in Step 307, features are computed, separately for each candidate pair of identifiers. The features may include, but are not limited to, the following:

(i) The number of times a device ID was logged during one or more time intervals of a specified duration. The occurrences may be weighted, based on the time that has elapsed. For example, a device ID logged within the most recent one hour time window may be weighted higher than a device ID log had occurred 14 hours ago.

(ii) The number of times a guest ID was logged during one or more time intervals of a specified duration. The occurrences may be also be weighted based on the time that has elapsed.

(iii) The number of times any device ID (i.e., the device ID of the candidate pair but also all other device IDs) was logged within a particular time span.

(iv) The number of times any guest ID (i.e., the guest ID of the candidate pair but also all other guest IDs) was logged within a particular time span.

Each of the aforementioned features may be weighted. For example, the weights may be used to adjust the weight of a logged guest ID or device ID, e.g., based on the frequency of their occurrence, and/or on other factors.

Those skilled in the art will appreciate that other features, such as whether a device ID was obtained from an ad exchange log or from a client event log, may be used without departing from the invention.

Continuing with the discussion of FIG. 3A, in Step 309, a probability is calculated for each candidate pair of identifiers, based on the features of the candidate pair. In one embodiment of the invention, the probability is a ratio of the number of times a device ID was registered or associated with the IP address, as described under (i) in Step 307, and the number of times any device ID was registered or associated with the IP address, as described under (iii) in Step 307. Intuitively, the ratio may be understood as the probability that a device with a particular device ID is associated with an activity that triggered the logging of a particular guest ID. One skilled in the art will recognize that probabilities obtained in step 309 may be obtained using other approaches without departing from the invention. The invention is thus not limited to the particular method for calculating the probability, described in Step 309.

In Step 311, the candidate pairs are pruned. Pruning may be performed if many device IDs are associated with a guest ID, or vice versa. Pruning may limit the number of device IDs associated with a guest ID, and/or the number of guest IDs associated with a device ID. Pruning may be performed based on the probabilities obtained in Step 309. Any candidate pairs below a certain probability threshold may be removed, or alternatively, a fixed number of pairs (the pairs with the highest calculated probabilities) may be picked, whereas all other pairs may be eliminated from consideration.

In Step 313, each candidate pair of identifiers is labeled using external and/or additional information. In one embodiment of the invention, the label associated with each candidate pair may one of the following: true positive, false positive, and unknown. A label of true positive indicates that identifiers in the candidate pair are in-fact associated with the same user (i.e., the external information independently validates that a relationship exists between the identifiers in the candidate pair). The information to independently validate the relationship may be a social media ID. Consider, for example, a scenario in which a candidate pair includes a device ID and a guest ID. Further, assume that a first social media ID was obtained along with the device ID and a second social media ID was obtained along with the guest ID. If the first social media ID matches the second social media ID, the candidate pair is labeled as "true positive". A label of false positive indicates that identifiers in the candidate pair are in-fact not associated with the same user (i.e., the external information independently validates that no relationship exists between the identifiers in the candidate pair). In the above scenario, assume that the first and the second social media ID do not match. In this case, the candidate pair is labeled as "false positive". Finally, in scenarios in which the external information is not available and/or is not sufficient to be used to label the candidate pair as "true positive" or "false positive", a label of unknown is assigned to the candidate pair.

In one embodiment of the invention, mappings created using the deterministic ID bridging method shown in FIG. 2 may be used to label the candidate pairs in step 313. Specifically, if a mapping exists between a device ID and a partner user ID (as determined from FIG. 2), the corresponding pair (i.e., the candidate pair that relates the device ID to the partner user ID) may be labeled "true positive". Further, if a mapping exists between a device ID and a second partner user ID (as determined from FIG. 2), the corresponding pair (i.e., the candidate pair that relates the device ID to the first partner user ID) may be labeled "false positive".

In Step 315, the candidate pairs of identifiers including the features and probabilities computed in Steps 307 and 309, respectively, and the labels assigned in Step 313, may be merged with previously obtained candidate pairs. The previously obtained candidate pairs may have been obtained at an earlier time. For example, the method described in FIG. 3A may be executed following a fixed schedule, e.g. once per day. Thus, labeled candidate pairs obtained from the current execution of the method may be added to a set of labeled candidate pairs obtained from prior executions of the method.

In Step 317, prior to classifier training, one or more features, e.g., identified in step 307, may be selected for use in training the probabilistic classifier. The following describes possible features (or sets of features) that may be used for training the probabilistic classifier. The invention is not limited to the features (or set of features) listed below.

Example Features or Sets of Features (a) A triplet including an IP address associated with both identifiers in the candidate pairs, a time window during which the candidate pair was seen and a weight. The weight may be any aggregate function of a set of requests affiliated with the device ID of the candidate pair, using the IP address during the time window.

(b) A triplet including an IP address associated with both identifiers in the candidate pairs, a time window during which the candidate pair was seen and a weight. The weight may be any aggregate function of a set of requests affiliated with the guest ID of the candidate pair, using the IP address during the time window.

(c) A triplet including an IP address associated with both identifiers in the candidate pairs, a time window during which the candidate pair was seen and a weight. The weight may be any aggregate function of a set of requests affiliated with the device ID of the candidate pair, using the IP address during all time windows. Earlier time windows (i.e., windows further back in time) may be down-weighted.

(d) A triplet including an IP address associated with both identifiers in the candidate pairs, a time window during which the candidate pair was seen and a weight. The weight may be any aggregate function of a set of requests affiliated with the guest ID of the candidate pair, using the IP address during all time windows. Earlier time windows (e.g., windows further back in time) may be down-weighted.

(e) A triplet including an IP address associated with both identifiers in the candidate pairs, a time window during which the candidate pair was seen and a weight. The weight may be any aggregate function of a set of requests affiliated with all device IDs (i.e., not limited to the device ID in the candidate pair), using the IP address during the time window.

(f) A triplet including an IP address associated with both identifiers in the candidate pairs, a time window during which the candidate pair was seen and a weight. The weight may be any aggregate function of a set of requests affiliated with all guest IDs (i.e., not limited to the guest ID in the candidate pair), using the IP address during the time window.

(g) A triplet including an IP address associated with both identifiers in the candidate pairs, a time window during which the candidate pair was seen and a weight. The weight may be a sum of all weights of all device IDs over all time windows using the IP address, i.e., the weights obtained in (e), over all time windows.

(h) A triplet including an IP address associated with both identifiers in the candidate pairs, a time window during which the candidate pair was seen and a weight. The weight may be a sum of all weights of all guest IDs over all time windows using the IP address, i.e., the weights obtained in (f), over all time windows.

(i) A triplet including an IP address associated with both identifiers in the candidate pairs, a time window during which the candidate pair was seen and a probability. The probability, in accordance with an embodiment of the invention, is a ratio of the weight described under (c) and the weight described under (g). The weight described under (g) may be limited to a maximum of 1.0.

(j) A triplet including an IP address associated with both identifiers in the candidate pairs, a time window during which the candidate pair was seen and a weight. The weight may be the number of unique device IDs seen by the ad exchange, and associated with the IP address, over all time windows.

(k) A triplet including an IP address associated with both identifiers in the candidate pairs, a time window during which the candidate pair was seen and a weight. The weight may be the number of unique guest IDs seen by the ad exchange, and associated with the IP address, over all time windows.

Those skilled in the art will recognize that many combinations of features to be used for classifier training are feasible and may thus be used without departing from the invention.

Selection of these features may be specific to a particular scenario. In one embodiment of the invention, at least some of the features are scaled to be within a certain numerical range. For example, a feature vector would not include IP addresses such as "123.123.123.123" or "124.125.126.127". Instead, a transformation may be applied to, for example, convert "123.123.123.123" to "1" and to convert "124.125.126.127" to "2". Similarly, discretization functions may be applied to transform float variables that may be in various ranges to integer values within a desired range. These discretization functions may be linear or nonlinear.

In Step 319, the classifier is trained to distinguish between "true positive" and "false positive". In one embodiment of the invention, a logistic regression is used for performing the classification. The training of the logistic regression model may set a decision boundary that distinguishes between "true positive" and "false positive" pairs based on the input data established in Step 317. Those skilled in the art will recognize that the classifier is not limited to logistic regressions. Rather, any type of supervised machine learning may be used to obtain a classification rule that distinguishes "true positive" from "false positive", based on the labeled candidate pairs. This includes, for example, support vector machines, naïve Bayes, decision trees, etc.

The labeled candidate pairs may be separated into training and validation data. For example, 80% of the labeled candidate pairs may be used for training and 20% may be used for validation. A randomization of the labeled candidate pairs may be performed prior to the separation of the validation samples from the training samples.

In one embodiment of the invention, the classifier training may be performed using the Vowpal Wabbit method. The classifier training may be performed on a distributed system.

Classifier accuracy may be assessed using the validation samples. Further, based on the classifier accuracy, the features used for classification, may be updated, gains may be adjusted, or the labeled pairs to be used as classifier input may be sampled differently until a satisfactory classification performance is achieved.

FIG. 3B shows a method for bridging identifiers using the classifier established as described in FIG. 3A. The method may be executed periodically, e.g. daily, to update the bridged identifiers, or spontaneously whenever a new pair of identifiers becomes available. The method may be executed by the user mapping service.

In Step 351, the features for the pair of identifiers are established. The features to be established are features that the classifier algorithm may require as inputs, i.e., the features to be established are of similar format and type as the features discussed in Step 307, 309 and 317 of FIG. 3A.

In Step 353, the classifier is applied to the features of the pair of identifiers. The output, may be a classification as "true positive" or "false positive" that indicates whether the device ID and the guest ID should be bridged. Further, a probability score may indicate the confidence in the classification. Bridging may be performed if the classification was performed with at least a certain level of confidence.

The resulting newly established pair of identifiers may be used, for example, to enable partners or advertisers to target the user with advertisements on the device that the user is accessing and/or to attribute conversions to an advertisement viewed by the user, as subsequently described.

Figure 4:
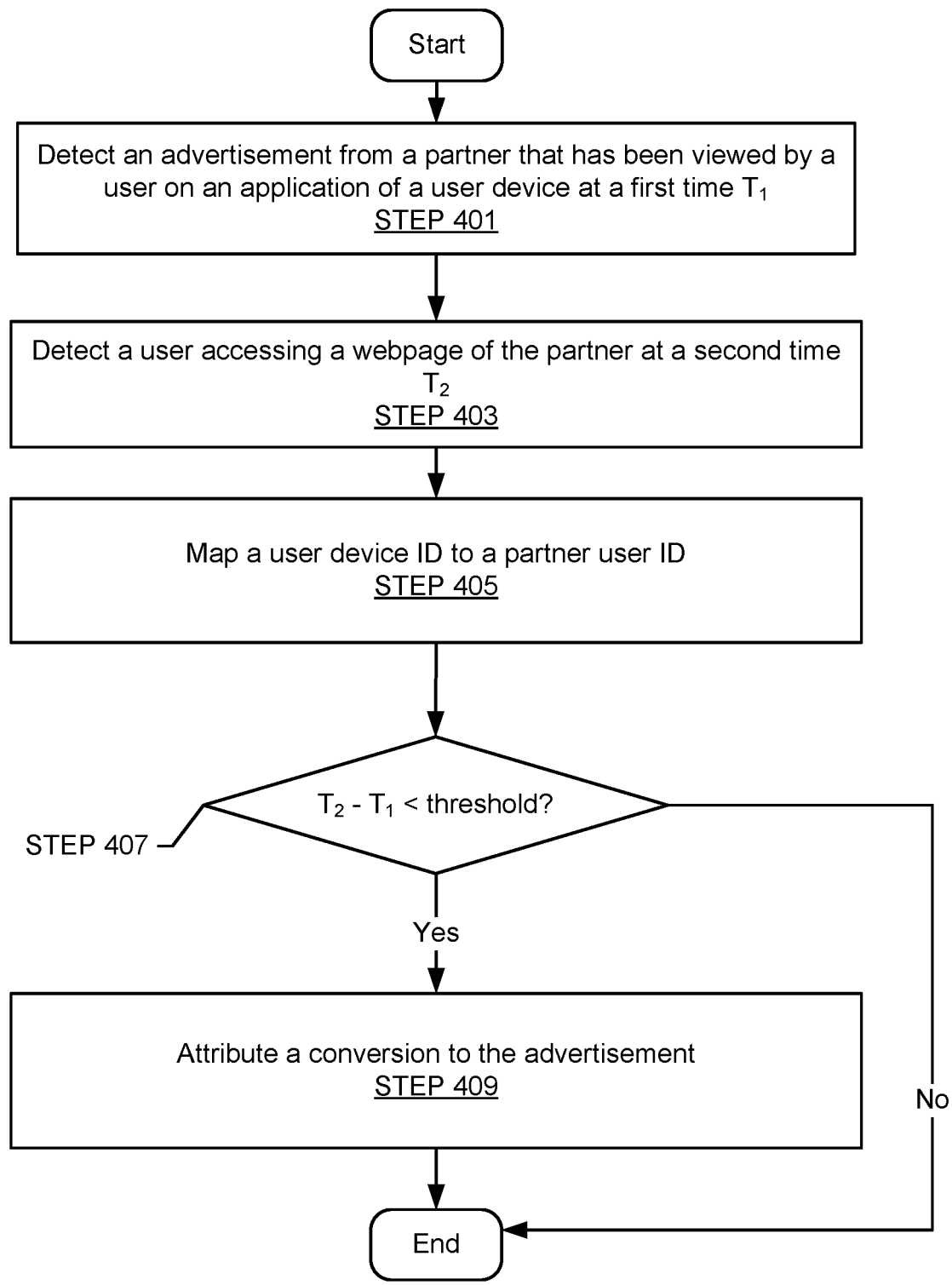
FIG. 4 shows a method for conversion attribution in accordance with one or more embodiments of the invention.

FIG. 4 shows a method for conversion attribution in accordance with one or more embodiments of the invention. The conversion attribution may rely on identifiers that may have been obtained as previously discussed.

In Step 401, the viewing of an advertisement a user in an application on a device at a first time $T_1$ is detected. Various methods for detecting that the advertisement has been viewed exist. These methods include, for example, detecting the user clicking on the advertisement, detecting the user sharing the advertisement by clicking on social media icons in connection with the advertisement, etc. As a result, an identifier such as a social media ID, a guest ID, and or a device ID may be provided to the user mapping service.

In Step 403, the user accessing the advertiser webpage at a second time $T_2$ is detected. Various methods for detecting that the advertiser webpage has been accessed exist. These methods include, for example, detecting that the user has completed a purchase, downloaded a file, filled out a form, signed a contract, provided solicited information, etc. As a result, an identifier such as a social media ID, a partner user ID, a guest ID, and or a device ID may be provided to the user mapping service.

In Step 405, a mapping service system is used to match the user from step 401 and the user from Step 403. For example, a device ID may need to be mapped to a partner user ID. The mapping may be performed based on the methods described in FIGS. 2-3B. If a social media ID is available from Steps 401 and 403, the social media ID may be used to perform the mapping as described in FIG. 2. Alternatively, the method of FIGS. 3A and 3B may be used to perform the mapping.

In Step 407, $T_1$ and $T_2$ are compared. If a determination is made that the difference between $T_2$ and $T_1$ is less than a preset threshold, then the method may proceed to Step 409 to attribute the conversion to the advertisement. If the condition is not met, the execution of the method may terminate without making the attribution. Step 407 may thus effectively prevent attributing a conversion in which $T_1$ and $T_2$ occur too far apart for the advertisement to have been effective. The threshold may be as short as a minute or may be as long as a week depending on various circumstances (the length of the advertisement campaign, the number of avenues for advertisement placement, etc.).

In Step 409, the conversion is attributed to the advertisement, thereby providing a feedback to the one or more advertisers. The feedback may be an entry including the number of users who have made a purchase, a probability score that enables the advertisers to know the confidence of the conversion attribution, cost-benefit analysis of the advertisement etc.

Figure 5:
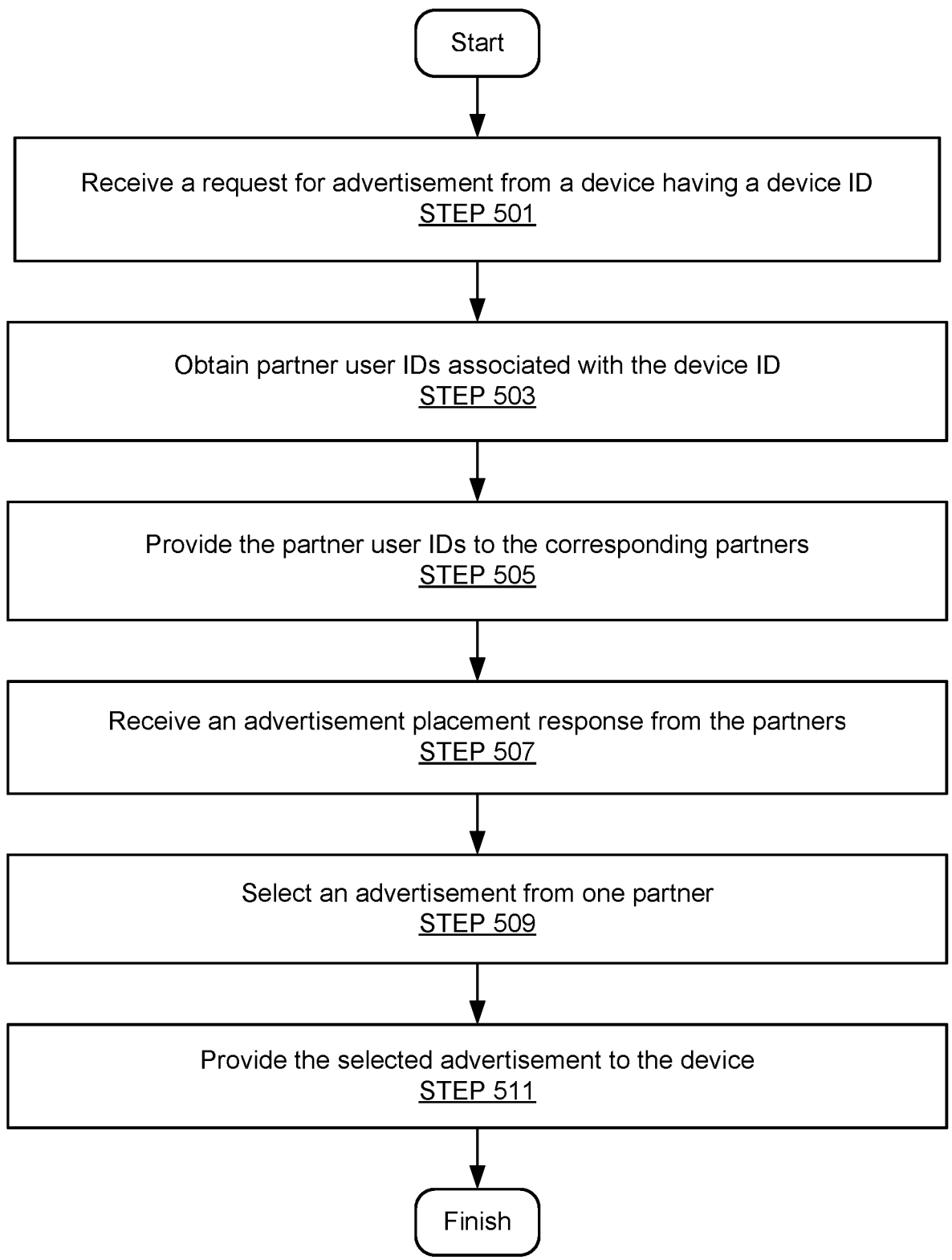
FIG. 5 shows a method for targeting advertisements in accordance with one or more embodiments of the invention.

FIG. 5 shows a method for targeting advertisements in accordance with one or more embodiments.

In Step 501, a request for an advertisement from a device having a device ID is received by an advertisement server system. The request process typically takes place when the device runs an application.

In Step 503, partner user IDs associated with a device ID is obtained from a user mapping service.

In Step 505, the partner user IDs and the device ID are provided to advertisers. With the partner IDs, the advertisers can determine prior behaviors of the users associated with the partner IDs.

In Step 507, advertisement placement responses from the advertisers are received. In this step, the advertisers may choose to submit or not submit an advertisement to the user, based on the purchase behavior associated with the partner user ID.

In Step 509, an advertisement from one advertiser is selected to fill the ad request. An advertisement exchange may participate in the selection of the ad, for example by providing real time bidding enabling the advertisers to bid for the advertisement opportunity. In Step 511, the selected advertisement appears on the device running the application.

FIG. 6 shows examples in accordance with one or more embodiments of the invention. The following examples are not intended to limit the scope of the invention.

First Example

Sam is using a first device (601) to execute a social media application (605). As Sam browses the social media application (605) on the first mobile device (601) he sees an advertisement from advertiser A (617), a sportswear company. At some point while using the social media application, Sam's device ID and social media ID associated with the first device (601) are forwarded to a user mapping service (609).

Upon seeing the advertiser A advertisement on the first device (601), Sam decides to use the same device (601) to visit the advertiser A webpage (not shown). As soon as Sam makes a purchase on the advertiser A webpage a cookie (not shown) fires information to a data base that subsequently forwards the information contained in the cookie to the user mapping service (609). From the cookie, the user mapping service (609) knows Sam's partner A ID (i.e., partner A user ID assigned by partner (615) to Sam) that is associated with Sam's device ID. Further, because the user mapping service (609) also includes a mapping between Sam's device ID and social media ID, the user mapping service (609) may then create and store mapping between Sam's device ID to Sam's partner A ID. Using the aforementioned mapping, advertiser A (617) (directly or indirectly) may be able to determine how effective its advertisement is on the social media network (i.e., the social media network that is associated with the social media ID).

Second Example

Sam is using a first device (601) to run a social media application (605). As Sam uses the social media application (605) on the first device (601) he sees an advertisement from advertiser A (617). At some point while Sam is using the social media application (605), Sam's device ID and social media ID associated with the first device (601) are forwarded to a user mapping service (609).

Upon seeing the advertiser A advertisement on the first device (601), Sam decides to use a second device (603) to visit the advertiser A webpage (607). Sam has previously visited the social media network (via a web browser) using the second device (603); accordingly, Sam's social media ID and other relevant information are stored in the form of a cookie (621) on the second device (603). As soon as Sam makes a purchase on the advertiser A webpage (607) using the second device (603) a cookie (619) fires to an ID synchronizing service (611). The ID synchronizing service (611) is able to create a mapping between Sam's social media ID and Sam's partner A ID because this information is included within the cookie (619).

Because the social media ID associated with the partner A ID and the social media ID associated with the device ID are the same, the user mapping service (609) infers that the individual with the device ID associated with the first device (601) is the same person as the individual with the partner A ID associated with the second device (603). The user mapping service (609) then may create, store, and/or forward such mappings. Effectively, advertiser A (617) is now able to methodologically understand how effective its advertisement is on the social network.

Third Example

Consider a scenario in which an ad placement request with a device ID is sent to the ad server system (613) from Sam's device (601). The ad server system determines the corresponding partner user ID for Sam using a device ID to partner ID mapping obtained from the user mapping service (609). The ad server may then provide the partner user ID to the partner (615), which may subsequently provide this information to one or more advertisers (617). In this example if the partner user ID is associated with advertiser A then advertiser A (e.g., an insurance company from which Sam has purchased car insurance) may be provided with Sam's partner user ID along with a request for an ad. Said another way, advertiser A will be provided with an opportunity to bid on an ad to be shown to the user associated with the partner user ID, where advertiser A may have other information about the user identified with partner user ID (i.e., Sam) has interacted with the advertiser A's website in the past.

For the purposes of this example assume that advertiser A wants to show an ad to the user associated with the partner user ID. In such cases, advertiser A provides an ad to the ad network, which may then forward the ad to the advertisement server system. Those skilled in the art will appreciate that the advertisement server system may interact directly with the advertisers (617) without departing from the invention. Continuing with the example, assume that the ad from advertiser A is ultimately displayed to Sam on his device (601) via the application (605) (i.e., the application that included the ad placement). The mapping between the device ID and the partner user ID which, although not known to the advertiser, may be used by the advertiser to target users with specific ads, where the information about the user's interaction with the advertiser's website is typically only known to the advertiser.

Fourth Example

Consider a scenario in which advertiser A (617) wants to advertise to its frequent customers, including Sam. However, advertiser A (617) only possesses Sam's email address.

In such cases, the user mapping service may know the following information: (i) a social media ID for Sam and (ii) an email address for Sam, where the email address corresponds to the email address that Sam used to initially sign-up to the social media network.

Advertiser A may still be able to target advertising to Sam based on the relationship between Sam's social media ID and his email address, which advertiser A possesses. More specifically, when Sam is using the application (605) on his device, an advertisement may be targeted to Sam as follows: (i) application (605) sends the device ID to the ad server system (613); (ii) the ad server system uses the device ID along with the device ID to social media ID mapping to obtain a social media ID corresponding to the device ID; (iii) the user mapping service may then obtain the Sam's email address using the social media ID to email mapping (discussed above); (iv) the ad server may then provide the email map (directly or indirectly) to advertiser A; (v) advertiser A may then use this information to determine whether to bid for its ad to be shown to Sam; (vi) if advertiser A's bid is successful, advertiser A's ad is subsequently shown to Sam via the application (605).

The above-examples are not intended to limit the scope of the invention. One of ordinary skill in the art with the benefit of the detailed specification would understand that variations to the invention, including the addition and/or the removal of certain steps, features, components, are possible and fall within the scope of the invention. For example, in Example 3, advertiser A (617) may communicate directly with the advertisement server system (613).

Figure 7:
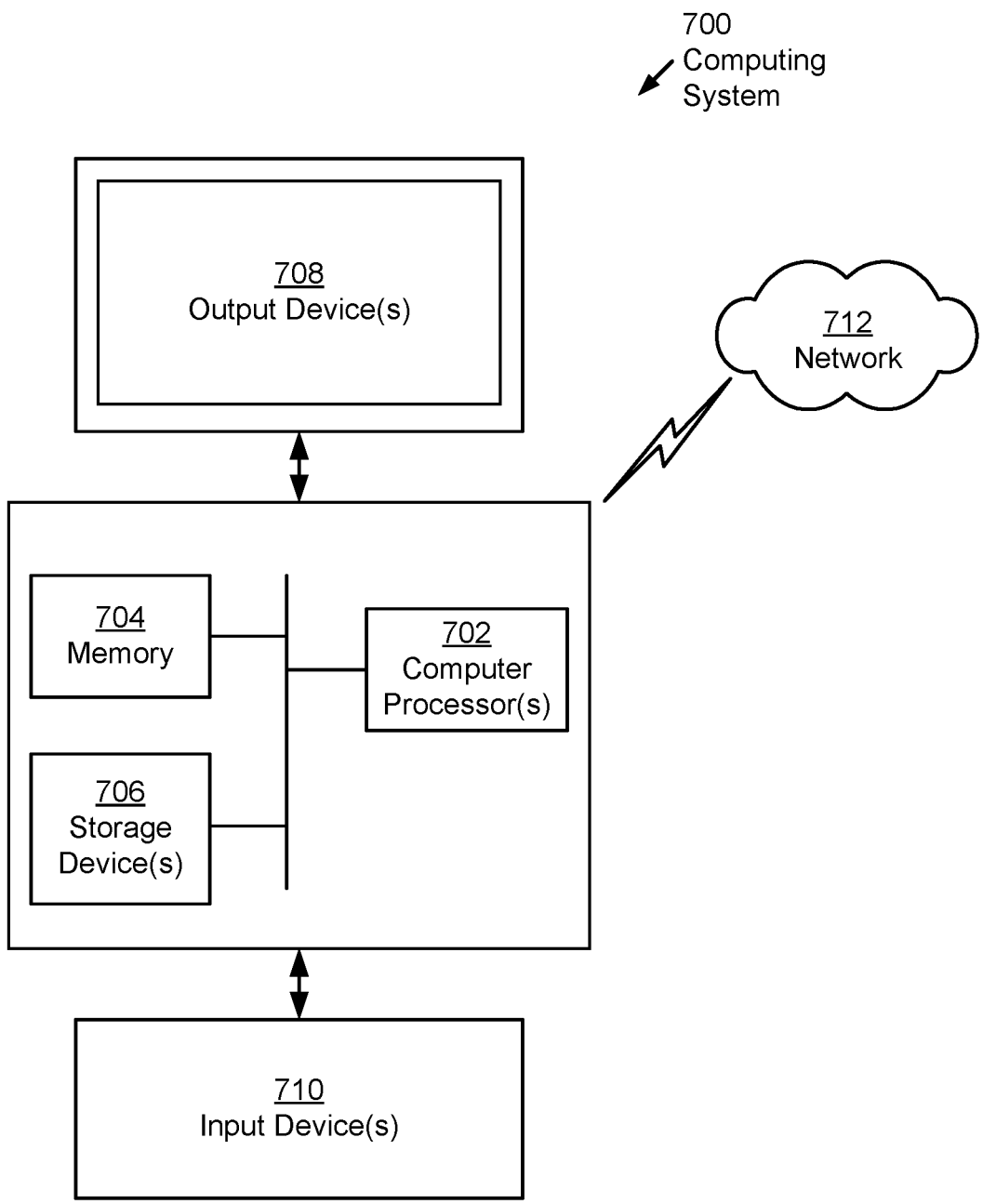
FIG. 7 shows an example computing system.

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (700) may be located at a remote location and connected to the other elements over a network (712). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method comprising:
performing deterministic identifier bridging to obtain a collection of mappings between pairs of identifiers, wherein the mapping between a pair of identifiers indicates that the identifiers are associated with a common user;
training a probabilistic classifier using the collection of mappings wherein the probabilistic classifier is trained to generate a probability that two input identifiers, of different types, are associated with a particular common user;
after the training:
mapping a collection of identifiers based on a determination, made by the probabilistic classifier, that respective pairs of identifiers are associated with a common user;
receiving a fill request from an application of a user device, wherein the fill request comprises a request for content to fill a portion of a user interface of the application, and wherein the fill request includes a device identifier identifying the user device;
using the respective pairs of identifiers to determine one or more partner identifiers mapped to the device identifier;
sending the received one or more partner identifiers along with a content request to a plurality of content providers;
receiving, in response to the content request, a plurality of content responses from one or more content providers of the plurality of content providers;
selecting a content response from the content responses; and
providing the content response to the user device in response to the fill request, the content response including content to fill the portion of the user interface.

2. The method of claim 1, wherein each partner identifier of the plurality of partner identifiers identifies a respective user, wherein the partner identifier is created when the respective user accesses content provided by a corresponding partner of a plurality of partners.

3. The method of claim 2, wherein the content provided by particular partner for placement on the application of the user device is selected based on information about a user of the user device determined from the partner identifier for the particular partner and mapped to the device identifier.

4. The method of claim 3, wherein the content provided by the particular partner for placement on the application of the user device is selecting without receiving the device identifier.

5. The method of claim 2, wherein:
a partner of the plurality of partners is configured to provide digital content to a social media platform comprising a plurality of user accounts;
the mapping further maps each of the plurality of device identifiers and the plurality of partner identifiers to a plurality of social media identifiers identifying respective user accounts of the plurality of user accounts.

6. The method of claim 1, wherein the mapping includes associations between the plurality of device identifiers and a plurality of partner user identifiers based on a determination that a probability of each association is more than a threshold value.

7. A non-transitory computer program product storing instructions that, when executed by at least one programmable processor, cause the at least one programmable processor to perform operations comprising:
performing deterministic identifier bridging to obtain a collection of mappings between pairs of identifiers, wherein the mapping between a pair of identifiers indicates that the identifiers are associated with a common user;
training a probabilistic classifier using the collection of mappings wherein the probabilistic classifier is trained to generate a probability that two input identifiers, of different types, are associated with a particular common user;
after the training:
mapping a collection of identifiers based on a determination, made by the probabilistic classifier, that respective pairs of identifiers are associated with a common user;
receiving a fill request from an application of a user device, wherein the fill request comprises a request for content to fill a portion of a user interface of the application, and wherein the fill request includes a device identifier identifying the user device;
using the respective pairs of identifiers to determine one or more partner identifiers mapped to the device identifier;
sending the received one or more partner identifiers along with a content request to a plurality of content providers;
receiving, in response to the content request, a plurality of content responses from one or more content providers of the plurality of content providers;
selecting a content response from the content responses; and
providing the content response to the user device in response to the fill request, the content response including content to fill the portion of the user interface.

8. The non-transitory computer program product of claim 7, wherein each partner identifier of the plurality of partner identifiers identifies a respective user, wherein the partner identifier is created when the respective user accesses content provided by a corresponding partner of a plurality of partners.

9. The non-transitory computer program product of claim 8, wherein the content provided by particular partner for placement on the application of the user device is selected based on information about a user of the user device determined from the partner identifier for the particular partner and mapped to the device identifier.

10. The non-transitory computer program product of claim 9, wherein the content provided by the particular partner for placement on the application of the user device is selecting without receiving the device identifier.

11. The non-transitory computer program product of claim 8, wherein:
a partner of the plurality of partners is configured to provide digital content to a social media platform comprising a plurality of user accounts;
the mapping further maps each of the plurality of device identifiers and the plurality of partner identifiers to a plurality of social media identifiers identifying respective user accounts of the plurality of user accounts.

12. The non-transitory computer program product of claim 7, wherein the mapping includes associations between the plurality of device identifiers and a plurality of partner user identifiers based on a determination that a probability of each association is more than a threshold value.

13. A system comprising:
at least one programmable processor; and
a machine-readable medium storing instructions that, when executed by the at least one processor, cause the at least one programmable processor to perform operations comprising:
performing deterministic identifier bridging to obtain a collection of mappings between pairs of identifiers, wherein the mapping between a pair of identifiers indicates that the identifiers are associated with a common user;
training a probabilistic classifier using the collection of mappings wherein the probabilistic classifier is trained to generate a probability that two input identifiers, of different types, are associated with a particular common user;
after the training:
mapping a collection of identifiers based on a determination, made by the probabilistic classifier, that respective pairs of identifiers are associated with a common user;
receiving a fill request from an application of a user device, wherein the fill request comprises a request for content to fill a portion of a user interface of the application, and wherein the fill request includes a device identifier identifying the user device;
using the respective pairs of identifiers to determine one or more partner identifiers mapped to the device identifier;
sending the received one or more partner identifiers along with a content request to a plurality of content providers;
receiving, in response to the content request, a plurality of content responses from one or more content providers of the plurality of content providers;
selecting a content response from the content responses; and
providing the content response to the user device in response to the fill request, the content response including content to fill the portion of the user interface.

14. The system of claim 13, wherein each partner identifier of the plurality of partner identifiers identifies a respective user, wherein the partner identifier is created when the respective user accesses content provided by a corresponding partner of a plurality of partners.

15. The system of claim 14, wherein the content provided by particular partner for placement on the application of the user device is selected based on information about a user of the user device determined from the partner identifier for the particular partner and mapped to the device identifier.

16. The system of claim 15, wherein the content provided by the particular partner for placement on the application of the user device is selecting without receiving the device identifier.

17. The system of claim 14, wherein:
a partner of the plurality of partners is configured to provide digital content to a social media platform comprising a plurality of user accounts;
the mapping further maps each of the plurality of device identifiers and the plurality of partner identifiers to a plurality of social media identifiers identifying respective user accounts of the plurality of user accounts.

18. The system of claim 13, wherein the mapping includes associations between the plurality of device identifiers and a plurality of partner user identifiers based on a determination that a probability of each association is more than a threshold value.

* * * * *